2 Sheets—Sheet 1.

E. DRAKE.
Machine for Sawing Shingles.

No. 218,620.      Patented Aug. 19, 1879.

WITNESSES:      INVENTOR:

2 Sheets—Sheet 2.

E. DRAKE.
Machine for Sawing Shingles.

No. 218,620. Patented Aug. 19, 1879.

WITNESSES:
Chas. H. Kimball.
Chas. F. Mooney.

INVENTOR:
Eldridge Drake
Per atty
William Henry Clifford

N. PETERS, PHOTO-LITHOGRAPHER, WASHINGTON, D. C.

UNITED STATES PATENT OFFICE.

ELBRIDGE DRAKE, OF GARDINER, MAINE.

IMPROVEMENT IN MACHINES FOR SAWING SHINGLES.

Specification forming part of Letters Patent No. 218,620, dated August 19, 1879; application filed April 12, 1878.

*To all whom it may concern:*

Be it known that I, ELBRIDGE DRAKE, of Gardiner, in the county of Kennebec and State of Maine, have invented certain new and useful Improvements in Machines for Sawing Shingles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
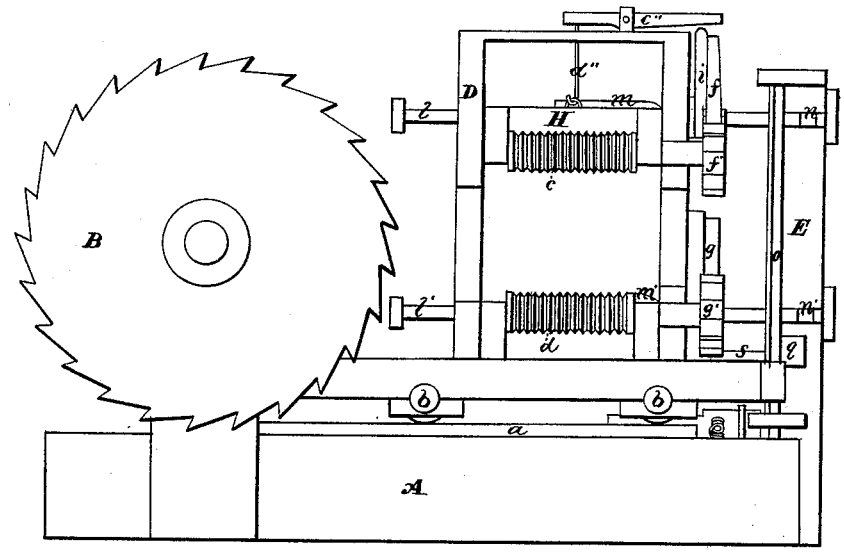
Figure 2:
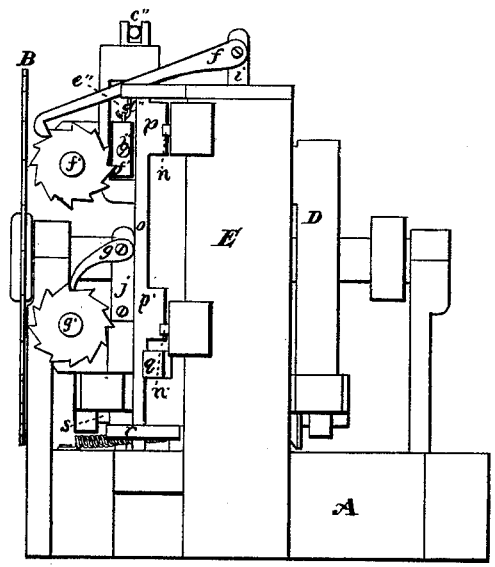
Figure 3:
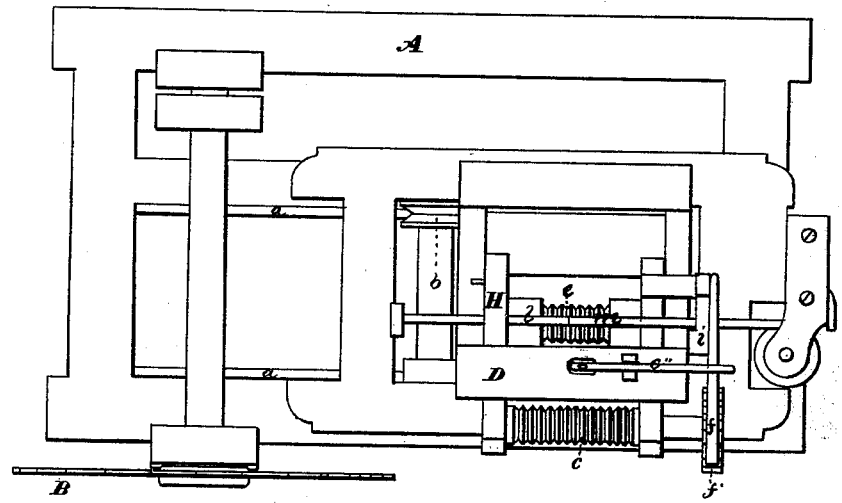
Figures 4, 6, 7:
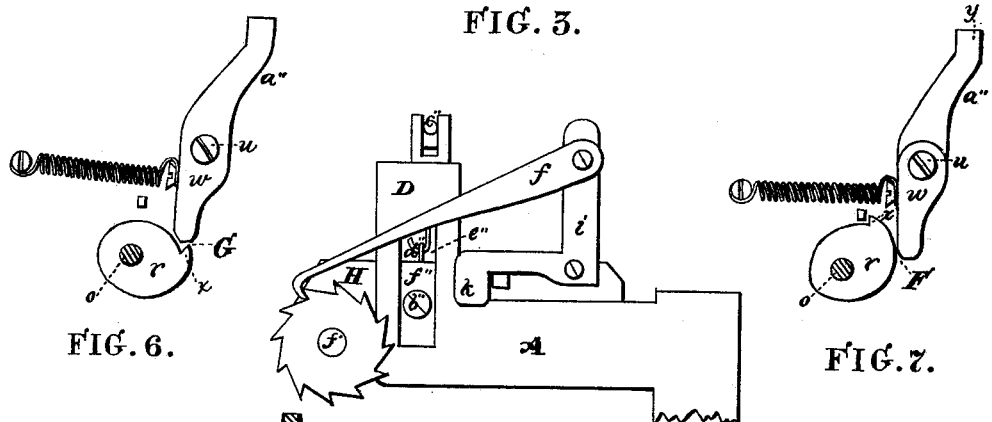
Figures 5, 8:
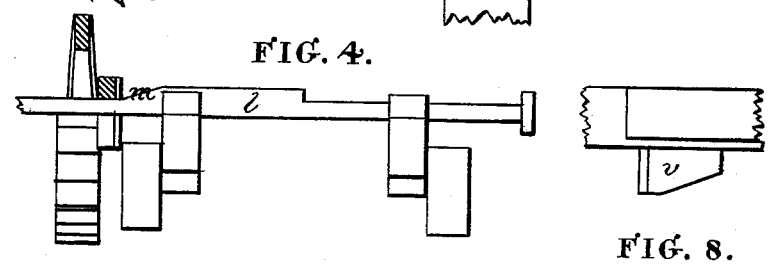

Figure 1 is a side elevation. Fig. 2 is an end elevation. Fig. 3 is a top plan. Fig. 4 is a detail. Fig. 5 is a detail. Fig. 6 is a detail of the arm $w$ in one position. Fig. 7 is the same in another position. Fig. 8 is a detail of the projection $v$.

My invention relates to a machine for sawing heading and other lumber.

It consists in a rocking head-block, a rocking adjustable head-block, devices for obtaining the set of the lumber while the reciprocating frame is moving toward the saw, and a head-block with two feed-rolls.

A is the bed or base of the machine. B is the saw. D is the reciprocating frame, carrying the devices for moving the lumber as it is sawed. The frame D moves on tracks $a$ and upon its trucks $b$. The frame D has two feed-rolls, $c$ and $d$, between which the lumber is held, one at the top and one at the bottom, and a third feed-roll behind the top roll, $c$, which is shown at $e$.

By the rotation of the two rolls $c$ and $d$ the lumber is fed forward or set after each successive piece is sawed off from it, and so as to regulate the thickness of the next piece to be sawed off. This is effected by the two pawls $f\,g$ acting upon the two ratchets $f'\,g'$, rigidly fixed on the shafts of the feed-rolls $c$ and $d$.

Let it be remarked that this set or forward movement of the lumber is produced while the frame D is moving forward toward the saw. This movement is an even one, and accomplished without jar; therefore the set is made more accurately and uniformly than when made on the opposite movement of the frame.

The pawls $f\,g$ are connected with two bell-crank levers, $i\,j$. The lever $i$ is pivoted to the side of the frame D, and the lever $j$ pivoted to the rocking head-block H. These levers have weighted ends $k$. Running across the frame of the head D are two sliding rods, $l\,l'$. $l$ is the upper one, and $l'$ the lower. These rods are provided with inclined planes $m\,m'$. On their outer ends they have hooks or shoulders $n\,n'$.

$o$ is an upright shaft set at the end of the bed A opposite to the saw. It is capable of revolution, and at its top and bottom ends has proper bearings. It carries the two projections $p\,p'$, the projection $q$, and a cam, $r$, at its bottom end. As the frame D retires from the saw the hooks $n\,n'$ of the sliding rods $l\,l'$ pass by the shoulders or projections $p\,p'$, they being at that time turned inwardly, or toward the saw, so as to allow them to pass. The frame then continues to move until the arm $s$ strikes the projection $q$, when the upright shaft is so turned as to move the projections $p\,p'$ up behind the hooks $n\,n'$. When the hooks $n\,n'$ have passed beyond the projections $p\,p'$ the ends of the sliding rods strike the stops $t\,t'$, and then the further motion of the frame D pushes the sliding rods $l\,l'$ back into the frame through guides provided for them. The frame D continues to so move away from the saw until stopped by the upright E. Then when the frame begins to move toward the saw the hooks $n\,n'$ are held for a time behind the projections $p\,p'$. This draws out the sliding arms or rods $l\,l'$, and their inclined planes $m\,m'$, passing under the lower arms of the bell-crank levers $i\,j$, so operate the pawls $f\,g$ as to give a slight motion to the feed-rolls $c\,d$, and thus feed out or set the lumber, so that when it reaches the saw it is prepared to have a piece sawed from it of a determined thickness. After the sliding rods $l\,l'$ are drawn out a certain distance by the advance of the frame toward the saw, the hooks $n\,n'$ of the sliding rods are released from the upright shaft or its projections $p\,p'$. This is done by a curved spring-arm pivoted at $u$ and working against a fixed projection, $v$, on the under side of the frame D. The arm is designated by $w$. The arm operates in connection with the cam $r$, before referred to.

When the frame D is retiring from the saw the cam $r$ and arm $w$ are in the positions shown at F, with the shoulder $x$ on the cam $r$ passed by the end of the arm $w$. The spring holds the arm $w$ pressed up against the cam. When the frame has moved far enough the end $y$ of the arm $w$ passes by the projection $v$, and the arm $s$ strikes the projection $q$ and turns the upright shaft, and with it the cam $r$, so that the shoulder $x$ overlaps the end of the arm $w$, as shown at G. This position of the cam $r$ prevents the upright shaft $o$ from turning, and the projections hold the sliding rods $l\ l'$ until the upright shaft $o$ is allowed to turn again, and permit the hooks $n\ n'$ to pass by the projections $p\ p'$. As the carriage moves toward the saw the cam $r$ comes against the bent part or elbow $a''$ of the arm $w$. This pushes the arm so that the shoulder $x$ of the cam $r$ can slip by the end of the arm, and then the hooks $n\ n'$ on the sliding arms or rods $l\ l'$ pull the upright shaft $o$ around, and the arms are released from the projections on the upright shafts. The frame D then continues to move up until the saw has cut off the piece desired from the lumber.

The backward and forward movements of the frame D are accomplished by the common means, are not claimed, and therefore not shown.

The feed-roll $e$, behind the top roll, $c$, serves to steady and hold evenly the lumber to be sawed.

The frame H is capable of rocking on the pivots $b''$. This is very important, and enables the frame to hold equally well lumber thicker at one end than at the other. The frame H is adjustable vertically by the lever $c''$, link $d''$, slots $e''$, and sliding boxes $f''$. This enables it to be used on lumbers of various sizes. When rising and falling the frame H carries the two upper feed-rolls, ratchet, pawl, bell-crank lever, and sliding rod.

What I claim as my invention, and desire to secure by Letters Patent, is—

1. The moving frame D, with its upper and lower feed-rolls, $c$ and $d$, its pawls and ratchets, sliding rods $l\ l'$, and their inclined planes, in combination with the upright $o$, cam $r$, and arm $w$, as herein described, to operate in making the set of the lumber while the frame moves toward the saw, as herein specified.

2. The frame or rocking head-block H in the frame D, when provided with the two feed-rolls, and when adjustable in a vertical direction, in combination with the rods $l\ l'$, upright $o$, and cam $r$, operating conjointly, as herein described.

In testimony that I claim the foregoing as my own I affix my signature in presence of two witnesses.

ELBRIDGE DRAKE.

Witnesses:
 WILLIAM HENRY CLIFFORD,
 CHAS. H. KIMBALL.